US007581247B2

(12) United States Patent
Sultan

(10) Patent No.: US 7,581,247 B2
(45) Date of Patent: *Aug. 25, 2009

(54) NETWORK ADDRESS TRANSLATION GATEWAY FOR NETWORKS USING NON-TRANSLATABLE PORT ADDRESSES

(75) Inventor: Israel Daniel Sultan, Paris (FR)

(73) Assignee: Symantec Operating Corporation, Mountain View, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 11/405,222

(22) Filed: Apr. 17, 2006

(65) Prior Publication Data

US 2006/0185010 A1 Aug. 17, 2006

Related U.S. Application Data

(63) Continuation of application No. 09/518,399, filed on Mar. 3, 2000, now Pat. No. 7,058,973.

(51) Int. Cl.
*G06F 15/16* (2006.01)
(52) U.S. Cl. .......................... 726/12; 726/11; 709/219; 709/229
(58) Field of Classification Search ................ 709/219, 709/229; 726/11–12
See application file for complete search history.

(56) References Cited

U.S. PATENT DOCUMENTS

| 5,781,550 | A | * | 7/1998 | Templin et al. ............. 370/401 |
| 5,825,891 | A | | 10/1998 | Levesque et al. |
| 5,898,784 | A | | 4/1999 | Kirby et al. |
| 5,940,591 | A | | 8/1999 | Boyle et al. |
| 5,983,350 | A | * | 11/1999 | Minear et al. ................. 726/11 |
| 6,006,259 | A | | 12/1999 | Adelman et al. |
| 6,055,236 | A | | 4/2000 | Nessett et al. |
| 6,347,376 | B1 | * | 2/2002 | Attwood et al. ................. 726/1 |
| 6,449,251 | B1 | * | 9/2002 | Awadallah et al. .......... 370/229 |
| 6,615,357 | B1 | * | 9/2003 | Boden et al. ................... 726/15 |
| 6,795,917 | B1 | * | 9/2004 | Ylonen ........................ 713/160 |
| 7,028,335 | B1 | * | 4/2006 | Borella et al. ................. 726/11 |
| 7,058,973 | B1 | * | 6/2006 | Sultan ........................... 726/12 |

OTHER PUBLICATIONS

Kent et al., "Security Architecture for the Internet Protocol", Nov. 1998, pp. 1-66.*
International Search Report; International Application No. PCT/US01/06257; International Filing Date: Feb. 27, 2001; Mailed on Jun. 14, 2001.

(Continued)

*Primary Examiner*—Kimyen Vu
*Assistant Examiner*—Edward Zee
(74) *Attorney, Agent, or Firm*—Meyertons, Hood, Kivlin, Kowert & Goetzel, P.C.

(57) ABSTRACT

A network address translation gateway provides normal network translation for IP datagrams traveling from a local area network using local IP addresses to an external network, but suspends source service address (port) translation when the port is reserved for a specific protocol, such as the ISAKMP "handshaking" protocol that is part of the IPSec protocol model. ISAKMP exchanges require both source and target computers to use the same service address (port). By providing a network interface that does not translate the source service address (port), this gateway enables the initiation and maintenance of secure, encrypted transmissions using IPSec protocol between a local area network using local IP addresses and servers on the internet.

21 Claims, 11 Drawing Sheets

OTHER PUBLICATIONS

International Preliminary Examination Report; International Application No. PCT/US01/06257; International Filing Date; Feb. 27, 2001; Mailed on Jan. 15, 2002.

Stevens, Richard W.; "TCP/IP Illustrated, vol. 1—The Protocols" 1994; Addison Wesley; Section 3.3, 1st paragraph.

Supplementary European Search Report; Application No. EP 01 91 6265; Date of Search Mar. 4, 2004.

EPO Communication; Application No. 01 916 265.0-221; Nov. 25, 2004.

M Borella: 'RSIP Support for End to end Ipsec' Internet Article, [Online] Feb. 2000, pp. 1-19. http://www.watersprings.org/pub/id/draft-ietf-nat-rsip-ipsec-02.txt.

G. Montenegro: 'Negotiated Address Reuse (NAR)' Internet Article, http://www.watersprings/org/pub/id/draft-montenegro-aatn-nar-01.txt, Jan. 18, 1999.

D. Senie: "NAT Friendly Application Design Guidelines" Internet Article, Sep. 1999, http://www3.ietf.org/proceedings/99nov/I-D/draft-ietf-nat-app-guide-02.txt.

* cited by examiner

| ID ADDRESSES | | | | |
|---|---|---|---|---|
| | LOCAL COMPUTER | GATEWAY INTERNAL | GATEWAY EXTERNAL | TARGET |
| L-1 | 192.168.0.2 | 102.168.0.1 | 142.140.3.6 | 204.71.202.160   T-1 |
| L-2 | 192.168.0.4 | 102.168.0.1 | 142.140.3.6 | 207.46.131.137   T-2 |
| L-3 | 192.168.0.3 | 102.168.0.1 | 142.140.3.6 | 207.158.227.235   T-3 |

FIG. 4

| SPI TABLE - 8 LOCAL COMPUTERS COMMUNICATING WITH 3 HOSTS | | | | |
|---|---|---|---|---|
| | TARGET | LOCAL IP | SPI-OUT | SPI-IN |
| T-1 | 204.71.202.160 | 192.168.0.2   L-1 | 4859 | 9802 |
| | | 192.168.0.5   L-X | 52856 | 7000 |
| | | 192.168.0.10  L-X | 8565 | 8523 |
| T-2 | 207.46.131.137 | 192.168.0.4   L-2 | 1353 | 6234 |
| | | 192.168.0.7   L-X | 2562 | 10125 |
| | | 192.168.0.10  L-X | 25763 | 12106 |
| T-3 | 207.158.227.235 | 192.168.0.3   L-3 | 38935 | 7753 |
| | | 192.168.0.8   L-X | 9093 | 32828 |

FIG. 5a

| NEW SESSION - NEW SPI-OUT - SPI-IN SET TO 0 ||||
|---|---|---|---|
| | TARGET | LOCAL IP | SPI-OUT | SPI-IN |
| T-1 | 204.71.202.160 | 192.168.0.2  L-1 | 14662 | 0 |
| | | 192.168.0.5  L-X | 52856 | 7000 |
| | | 192.168.0.10 L-X | 8565 | 8523 |
| T-2 | 207.46.131.137 | 192.168.0.4  L-2 | 1353 | 4562 |
| | | 192.168.0.7  L-X | 2562 | 10125 |
| | | 192.168.0.10 L-X | 25763 | 12106 |
| T-3 | 207.158.227.235 | 192.168.0.3  L-3 | 8773 | 20889 |
| | | 192.168.0.8  L-X | 9093 | 32828 |

FIG. 5b

| REPLY PACKET RECEIVED - NEW SPI-IN RECEIVED ||||
|---|---|---|---|
| | TARGET | LOCAL IP | SPI-OUT | SPI-IN |
| T-1 | 207.200.0.2 | 192.168.0.2  L-1 | 14662 | 3288 |
| | | 192.168.0.5  L-X | 52856 | 7000 |
| | | 192.168.0.10 L-X | 8565 | 8523 |
| T-2 | 206.23.5.120 | 192.168.0.4  L-2 | 1353 | 6234 |
| | | 192.168.0.7  L-X | 43966 | 17937 |
| | | 192.168.0.10 L-X | 25763 | 12106 |
| T-3 | 207.198.75.3 | 192.168.0.3  L-3 | 8773 | 20889 |
| | | 192.168.0.8  L-X | 9093 | 32828 |

FIG. 5c

| FIG. 6 |
|---|
| FIG. 6A |
| FIG. 6B |

SEQUENCE OF PACKETS THROUGH GATEWAY
SINGLE LOCAL MACHINE -- SINGLE TARGET

| PATH | DATAGRAM TYPE | SOURCE ADDRESS IP | PORT | DESTINATION ADDRESS IP | PORT | SPI | ROW |
|---|---|---|---|---|---|---|---|
| LAN - GATE | UDP | 192.168.0.2 | 6404 | 204.71.202.160 | 80 | | 1 |
| GATE - NET | UDP | 142.140.3.6 | 10425 | 204.71.202.160 | 80 | | 2 |
| NET - GATE | UDP | 204.71.202.160 | 80 | 142.140.3.6 | 10425 | | 3 |
| GATE - LAN | UDP | 204.71.202.160 | 80 | 192.168.0.2 | 6404 | | 4 |
| LAN - GATE | ISAKMP-1 | 192.168.0.2 | 500 | 204.71.202.160 | 500 | | 5 |
| GATE - NET | ISAKMP-1 | 142.140.3.6 | 500 | 204.71.202.160 | 500 | | 6 |
| NET - GATE | ISAKMP-2 | 204.71.202.160 | 500 | 142.140.3.6 | 500 | | 7 |
| GATE - LAN | ISAKMP-2 | 204.71.202.160 | 500 | 192.168.0.2 | 500 | | 8 |
| LAN - GATE | ISAKMP-3 | 192.168.0.2 | 500 | 204.71.202.160 | 500 | | 9 |
| GATE - NET | ISAKMP-3 | 142.140.3.6 | 500 | 204.71.202.160 | 500 | | 10 |
| NET - GATE | ISAKMP-4 | 204.71.202.160 | 500 | 142.140.3.6 | 500 | | 11 |
| GATE - LAN | ISAKMP-4 | 204.71.202.160 | 500 | 192.168.0.2 | 500 | | 12 |
| LAN - GATE | ISAKMP-5 | 192.168.0.2 | 500 | 204.71.202.160 | 500 | | 13 |
| GATE - NET | ISAKMP-5 | 142.140.3.6 | 500 | 204.71.202.160 | 500 | | 14 |
| NET - GATE | ISAKMP-6 | 204.71.202.160 | 500 | 142.140.3.6 | 500 | | 15 |
| GATE - LAN | ISAKMP-6 | 204.71.202.160 | 500 | 192.168.0.2 | 500 | | 16 |

FIG. 6A

| | | | | |
|---|---|---|---|---|
| LAN - GATE | ESP (50) | 192.168.0.2 | 204.71.202.160 | 4859 | 17 |
| GATE - NET | ESP (50) | 142.140.3.6 | 204.71.202.160 | 4859 | 18 |
| NET - GATE | ESP (50) | 204.71.202.160 | 142.140.3.6 | 9802 | 19 |
| GATE - LAN | ESP (50) | 204.71.202.160 | 192.168.0.2 | 9802 | 20 |
| LAN - GATE | ESP (50) | 192.168.0.2 | 204.71.202.160 | 4859 | 21 |
| GATE - NET | ESP (50) | 142.140.3.6 | 204.71.202.160 | 4859 | 22 |
| NET - GATE | ESP (50) | 204.71.202.160 | 142.140.3.6 | 9802 | 23 |
| GATE - LAN | ESP (50) | 204.71.202.160 | 192.168.0.2 | 9802 | 24 |
| LAN - GATE | ESP (50) | 192.168.0.2 | 204.71.202.160 | 14662 | 25 |
| GATE - NET | ESP (50) | 142.140.3.6 | 204.71.202.160 | 14662 | 26 |
| NET - GATE | ESP (50) | 204.71.202.160 | 142.140.3.6 | 3288 | 27 |
| GATE - LAN | ESP (50) | 204.71.202.160 | 192.168.0.2 | 3288 | 28 |
| LAN - GATE | ESP (50) | 192.168.0.2 | 204.71.202.160 | 14662 | 29 |
| GATE - NET | ESP (50) | 142.140.3.6 | 204.71.202.160 | 14662 | 30 |
| NET - GATE | ESP (50) | 204.71.202.160 | 142.140.3.6 | 3288 | 31 |
| GATE - LAN | ESP (50) | 204.71.202.160 | 192.168.0.2 | 3288 | 32 |

| FIG. 7A |
|---|
| FIG. 7B |
| FIG. 7C |

SEQUENCE OF PACKETS THROUGH GATEWAY
MULTIPLE LOCAL MACHINES -- MULTIPLE TARGETS

| PATH | PACKET TYPE | SOURCE ADDRESS IP | SERVICE | DESTINATION ADDRESS | SERVICE | SPI | ACTIVE PROCESS | ROW |
|---|---|---|---|---|---|---|---|---|
| LAN - GATE | UDP | 192.168.0.2 | 6404 | 204.71.202.160 | 80 | | L-1 OUT | 1 |
| GATE - NET | UDP | 142.140.3.6 | 10425 | 204.71.202.160 | 80 | | T-1 IN | 2 |
| LAN - GATE | UDP | 192.168.0.4 | 4562 | 207.46.131.137 | 1353 | | L-2 OUT | 3 |
| GATE - NET | UDP | 142.140.3.6 | 37525 | 207.46.131.137 | 1353 | | T-2 IN | 4 |
| NET - GATE | UDP | 204.71.202.160 | 80 | 142.140.3.6 | 10425 | | T-1 OUT | 5 |
| GATE - LAN | UDP | 204.71.202.160 | 80 | 192.168.0.2 | 6404 | | L-1 IN | 6 |
| NET - GATE | UDP | 207.46.131.137 | 1353 | 142.140.3.6 | 37525 | | T-2 OUT | 7 |
| GATE - LAN | UDP | 207.46.131.137 | 1353 | 192.168.0.4 | 4562 | | L-2 IN | 8 |
| LAN - GATE | ISAKMP-1 | 192.168.0.2 | 500 | 204.71.202.160 | 500 | | L-1 OUT - PORT 500 BOUND TO 192.168.0. | 9 |
| GATE - NET | ISAKMP-1 | 142.140.3.6 | 500 | 204.71.202.160 | 500 | | T-1 IN - ASSOCIATED WITH 204.71.202.160 | 10 |
| NET - GATE | ISAKMP-2 | 204.71.202.160 | 500 | 142.140.3.6 | 500 | | T-1 OUT | 11 |
| GATE - LAN | ISAKMP-2 | 204.71.202.160 | 500 | 192.168.0.2 | 500 | | L-1 IN - PORT 500 RELEASED | 12 |
| LAN - GATE | ISAKMP-3 | 192.168.0.2 | 500 | 204.71.202.160 | 500 | | L-1 OUT - PORT 500 BOUND TO 192.168.0. | 13 |
| GATE - NET | ISAKMP-3 | 142.140.3.6 | 500 | 204.71.202.160 | 500 | | T-1 IN - ASSOCIATED WITH 204.71.202.160 | 14 |
| LAN - GATE | ISAKMP-1 | 192.168.0.3 | 500 | 207.158.227.235 | 500 | | L-3 OUT | 15 |
| GATE - NET | ISAKMP-1 | 142.140.3.6 | 500 | 207.158.227.235 | 8773 | | T-3 IN - PORT 500 NOT AVAILABLE | 16 |

FIG. 7A

| | | | | | | |
|---|---|---|---|---|---|---|
| NET - GATE | ISAKMP-4 | 204.71.202.160 | | 500 | 142.140.3.6 | T-1 OUT | 17 |
| GATE - LAN | ISAKMP-4 | 204.71.202.160 | 500 | 192.168.0.2 | | L-1 IN - PORT 500 RELEASED | 18 |
| LAN - GATE | ISAKMP-1 | 192.168.0.3 | 500 | 207.158.227.235 | | L-3 OUT | 19 |
| GATE - NET | ISAKMP-1 | 142.140.3.6 | 500 | 207.158.227.235 | | T-3 IN - PORT 500 BOUND TO 192.168.0.3 | 20 |
| LAN - GATE | ISAKMP-5 | 192.168.0.2 | 500 | 204.71.202.160 | | L-1 OUT - PORT 500 NOT AVAILABLE | 21 |
| GATE - NET | ISAKMP-5 | 142.140.3.6 | 500 | 204.71.202.160 | 9063 | T-1 IN - SOURCE PORT ADDRESS TRANSLATED | 22 |
| NET - GATE | ISAKMP-2 | 207.158.227.235 | 500 | 142.140.3.6 | | T-3 OUT | 23 |
| GATE - LAN | ISAKMP-2 | 207.158.227.235 | 500 | 192.168.0.3 | | L-3 IN - PORT 500 RELEASED | 24 |
| LAN - GATE | ISAKMP-5 | 192.168.0.2 | 500 | 204.71.202.160 | | L-1 OUT - PORT 500 BOUND TO 192.168.0. | 25 |
| GATE - NET | ISAKMP-5 | 142.140.3.6 | 500 | 204.71.202.160 | | T-1 IN - ASSOCIATED WITH 204.71.202.160 | 26 |
| | | | | | | TIME-OUT FOR T-1 OUT--PORT 500 RELEASED | 27 |
| LAN - GATE | ISAKMP-3 | 192.168.0.3 | 500 | 207.158.227.235 | | L-3 OUT | 28 |
| GATE - NET | ISAKMP-3 | 142.140.3.6 | 500 | 207.158.227.235 | | T-3 IN - PORT 500 BOUND TO 192.168.0.3 | 29 |
| NET - GATE | ISAKMP-6 | 204.71.202.160 | 500 | 142.140.3.6 | | T-1 OUT - PACKET IGNORED | 30 |
| | | | | | | T-1 OUT - PACKET IGNORED | 31 |
| NET - GATE | ISAKMP-4 | 207.158.227.235 | 500 | 142.140.3.6 | | T-3 OUT | 32 |
| GATE - LAN | ISAKMP-4 | 207.158.227.235 | 500 | 192.168.0.3 | | L-3 IN - PORT 500 RELEASED | 33 |
| LAN - GATE | ISAKMP-5 | 192.168.0.2 | 500 | 204.71.202.160 | | L-1 OUT - PORT 500 BOUND TO 192.168.0. | 34 |
| GATE - NET | ISAKMP-5 | 142.140.3.6 | 500 | 204.71.202.160 | | T-1 IN - ASSOCIATED WITH 204.71.202.160 | 35 |
| NET - GATE | ISAKMP-6 | 204.71.202.160 | 500 | 142.140.3.6 | | T-1 OUT | 36 |
| GATE - LAN | ISAKMP-6 | 204.71.202.160 | 500 | 192.168.0.2 | | L-1 IN - PORT 500 RELEASED | 37 |
| LAN - GATE | ESP (50) | 192.168.0.2 | | 204.71.202.160 | 4859 | L-1 OUT | 38 |
| GATE - NET | ESP (50) | 142.140.3.6 | | 204.71.202.160 | 4859 | T-1 IN | 39 |

FIG. 7B

| Dir | Protocol | Src IP | Src Port | Dst IP | Dst Port | SPI | Info | # |
|---|---|---|---|---|---|---|---|---|
| LAN - GATE | UDP | 192.168.0.4 | 4562 | 207.46.131.137 | 1353 | | L-2 OUT | 40 |
| GATE - NET | UDP | 142.140.3.6 | 37525 | 207.46.131.137 | 1353 | | T-2 IN | 41 |
| NET - GATE | ESP (50) | 204.71.202.160 | | 142.140.3.6 | | 9802 | T-1 OUT | 42 |
| GATE - LAN | ESP (50) | 204.71.202.160 | | 192.168.0.2 | | 9802 | L-1 IN | 43 |
| LAN - GATE | ISAKMP-5 | 192.168.0.3 | 500 | 207.158.227.235 | | | L-3 OUT - PORT 500 BOUND TO 192.168.0.3 | 44 |
| GATE - NET | ISAKMP-5 | 142.140.6.3 | 500 | 207.158.227.235 | | | T-3 IN - ASSOCIATED WITH 207.158.227.23 | 45 |
| LAN - GATE | ESP (50) | 192.168.0.2 | | 204.71.202.160 | | 4859 | L-1 OUT | 46 |
| GATE - NET | ESP (50) | 142.140.3.6 | | 204.71.202.160 | | 4859 | T-1 IN | 47 |
| NET - GATE | ISAKMP-6 | 207.158.227.235 | 500 | 142.140.3.6 | | | T-3 OUT | 48 |
| GATE - LAN | ISAKMP-6 | 207.158.227.235 | 500 | 192.168.0.3 | | | L-3 IN - PORT 500 RELEASED | 49 |
| NET - GATE | UDP | 207.46.131.137 | 1353 | 142.140.3.6 | 37525 | | T-2 OUT | 50 |
| GATE - LAN | UDP | 207.46.131.137 | 1353 | 192.168.0.4 | 4562 | | L-2 IN | 51 |
| LAN - GATE | ESP (50) | 192.168.0.3 | | 207.158.227.235 | | 38935 | L-3 OUT | 52 |
| GATE - NET | ESP (50) | 142.140.6.3 | | 207.158.227.235 | | 38935 | T-3 IN | 53 |
| NET - GATE | ESP (50) | 204.71.202.160 | | 142.140.3.6 | | 9802 | T-1 OUT | 54 |
| GATE - LAN | ESP (50) | 204.71.202.160 | | 192.168.0.2 | | 9802 | L-1 IN | 55 |
| NET - GATE | ESP (50) | 207.158.227.235 | | 142.140.3.6 | | 7753 | T-3 OUT | 56 |
| GATE - LAN | ESP (50) | 207.158.227.235 | | 192.168.0.3 | | 7753 | L-3 IN | 57 |

FIG. 7C

NETWORK ADDRESS TRANSLATION GATEWAY FOR NETWORKS USING NON-TRANSLATABLE PORT ADDRESSES

This application is a continuation of U.S. patent application Ser. No. 09/518,399, entitled "Network Address Translation Gateway for Local Area Networks Using Local IP Addresses and Non-Translatable Port Addresses", filed Mar. 3, 2000 now U.S. Pat. No. 7,058,973.

BACKGROUND

Virtual private networking (VPN) using TCP/IP enables secure, high speed communications between remote computing sites, using the internet as a communications medium. Information passing between sites across the internet may be protected against interception by unwanted eavesdroppers or malicious hackers by a variety of security measures. Effective security measures must, at a minimum, incorporate functions that ensure any or all of the following protections: Data integrity against the inadvertent or malicious modification of data during transit; prevention against denial-of-service attacks by employing anti-repeat measures; source authentication; confidentiality of source address and other header information during transit; and packet payload protection against unwanted interception. One standard model for providing internet security is the Internet Protocol Security suite, IPSec. IPSec works with the TCP/IP communications protocol to provide secure communications between devices connected to the internet or connected to private LANs (Local Area Networks) that are, themselves, connected to the internet.

The TCP/IP (Transmission Control Protocol/Internet Protocol) protocol suite uses IP addresses to identify each device on a network. A global IP address uniquely identifies a device on the internet Such devices may be computers, printers, routers, switches, gateways, or other network devices. Devices having global IP addresses may be directly referenced as a source or destination on the internet. The TCP/IP communications protocol, however, is not exclusively limited to the internet, but may be used on private LANs as well. Private LANs using TCP/IP frequently use "local" IP addresses for network devices. Although no two devices on a private LAN may share the same local IP address, private LANs are isolated from the internet, and local devices on the LAN are not visible from the internet. IP addresses for local devices therefore need not be "globally" unique. A LAN using local IP addresses will be connected to the internet through a gateway, which is a device that may filter or route messages between the LAN and the internet. Since the gateway is directly attached to the internet, and is visible to it, the gateway must have a globally unique IP address for communicating across the internet. However, since the LAN is not directly visible from the internet, local machines on the LAN do not require IP addresses that are globally unique.

TCP/IP is the communications protocol that is used on the internet. Information to be communicated using TCP/IP is contained in "datagrams." A datagram consists of a discrete "packet" of information to which one or more headers are appended. Headers contain information needed by TCP/IP to direct the packet to its intended destination and to ensure its proper handling during transit. Each datagram is individually addressable, and may be a connection-oriented TCP datagram or a "connectionless" UDP (User Datagram Protocol) datagram. Each UDP datagram includes an IP header and a UDP header. The IP header contains at least a "source" IP address and a "destination" IP address, while the UDP header includes source and destination service addresses (port addresses, given as numbers). In IPv4, IP addresses are 32 bits in length, and are associated with the now-familiar xxx.xxx.xxx.xxx format. In this format, each three-digit segment is a binary octet representing a number between 0 and 255. A complete IP address combines the address of a logical network or network segment with the address of a "node" (device) on the network. The address of the network or network segment may encompass the first 3, 6, or 9 digits of the IP address. A device on the network or network segment is identified by a node address that consists of those remaining digits that are not used in the network or network segment address.

The source and destination service addresses contained in a UDP header are 16-bit numbers, variously known as "ports" or "sockets," which are used to direct the packet to an intended process that is active on the sending or receiving device. The term "port," or "port address," as used herein, refers to a service address field in a UDP header. Although in theory there are as many ports as there are addresses in a 16-bit number, by convention many port addresses have been reserved for established processes. Thus, for example, port 80 is reserved for HTTP, and ports 20 and 21 are reserved for FTP. Through the use of port addresses, data arriving at a local machine running more than one process will be directed to the process for which it was intended. Where a process running on a local host is not one of the reserved processes, the local host may select any port number from a pool of unreserved port numbers to identify the "source" process. A reply packet referencing that port number in the "destination" field will be directed to the process.

With the explosive growth of internet usage during the last decade, and its projected growth in the future, globally unique IP addresses have become a scarce resource. In addition, many businesses maintaining private LANs have little or no need for each computer and device on the LAN to have a unique global IP address. Many such businesses would, in any event, prefer to maintain the confidentiality of their computers' IP addresses. Rather than waste limited global resources by giving each local device a unique global IP address, many private LANs utilize local IP addresses for devices on the LAN. In order to provide connectivity to the internet, such LANs will employ a single globally unique address to be used on the internet by the gateway separating the LAN from the internet.

Through the use of Network Address Translation (NAT) techniques, a gateway device separating a LAN from the internet can provide security as a firewall while enabling machines with local IP addresses to access the internet through the unique global address of the gateway. A device on a LAN may have a static local IP address, or it may have a local IP address dynamically assigned to it at log on. The gateway maintains a translation table with the local IP addresses for each device on the LAN. A UDP packet sent from a local machine and destined for the internet will have its local IP address and port address identified in the source fields of the IP and UDP headers, respectively. The gateway will receive the packet from the local machine, will substitute its external globally-unique IP address and a new port address (taken from a pool of unused, unreserved port addresses) into the source fields of the IP and UDP headers. It will next update the CRC (Cyclical Redundancy Check) and make any other necessary changes to ensure data integrity, then will send the packet to the internet. As part of the process, the gateway will update its internal translation table to cross reference the local machine's IP address with the source port address originally reported by that machine, with the new source port address assigned to the internet-bound packet, and with the destination IP address. Upon receipt of a reply from the internet, the gateway will recognize its own IP address in the packet header, and will examine the incoming packet's destination port address. If it finds the destination port address in its internal table, the gateway will substitute the cross referenced local machine's IP address and original port address into the destination fields of the packet, will update the CRC and any other necessary parameters, and then will dispatch the packet to the LAN, where it will be received by the local machine and directed to the appropriate process. In this manner, a number of computers on a LAN having only local IP addresses can communicate across the internet through a single globally unique IP address.

Although NAT gateways provide firewall security against direct accessing of the LAN from the internet, they do not provide security against interception or modification of a packet intended for the LAN while in transit on the internet, and they do not ensure "trustworthiness" from challenges originating within the LAN. Thus, the security provided by IPSec is a necessary protection for LANs that must maintain security while interfacing with the internet.

A common implementation of IPSec is to provide security for VPNs consisting of at least one main computing site and one or more remote LANs. The main site and remote LANs are connected across the internet, using that high speed medium to communicate between sites instead of significantly more expensive private leased lines. The drawback to using the internet as a transmission medium, however, is that the internet is inherently insecure, and provides little or no inherent protection against the snooping, detection, "spoofing," or ultimate theft, modification or diversion of messages by hackers. Thus, there is a need for comprehensive security measures where secure data transmissions are required. The IPSec protocol implements security measures to ensure authentication of data and data integrity.

The IPSec protocol suite implements security at the network layer of the multi-layered OSI (Open Systems Interconnection) network reference model. The suite includes a number of separate protocols that are used in conjunction with one another to ensure the security of UDP datagrams that carry information across the internet. The base architecture of IPSec compliant systems is explained in RFC2401, "Security Architecture for the Internet Protocol," S. Kent and R. Atkinson (November 1998). The AH (Authentication Header) protocol assures data integrity, source authentication, and incorporates "anti-repeat" measures to deter denial-of-service attacks. ESP (Encapsulation Security Payload) protocol provides protections similar to AH, but adds the additional feature of payload encryption. Both AH and ESP headers have a field for a Security Parameters Index (SPI). The SPI is a 32-bit pseudo-random value that is used to identify a Security Association (SA) for the datagram. Further information regarding these protocols may be found in RFC1826, "IP Authentication Header," by R. Atkinson (August 1995), and RFC2406, "IP Encapsulating Security Payload (ESP)," S. Kent and R. Atkinson (November 1998). ISAKMP/Oakley (Internet Security Association and Key Management Protocol, also commonly referred to as Internet Key Exchange—IKE) is a handshaking protocol that establishes the parameters for a secure session between two hosts and provides for the exchange of keying and other security information that is used to implement the secure session and permit the transmission of encrypted data. The ISAKMP/Oakley protocol (hereafter referred to simply as ISAKMP) involves the initial exchanges of unencrypted messages to provide both machines with initialization data from which authentication may be established and secure keys for data encryption may be generated. An explanation of these processes may be found in RFC2409, "The Internet Key Exchange," D. Harkins and D. Carrel (November, 1998). Once security parameters sufficient to establish Security Associations (SAs) between hosts have been exchanged, all subsequent transmissions will be encrypted and fully authenticated in accordance with the agreed-upon protocols. At that point the ISAKMP protocol terminates. Subsequent addressing is based upon the IP address for each machine and the machine's SPI for that session. The SPI is unique for each machine during a session. The gateway for a private LAN will maintain an internal table in which "SPI-in" in a value that is cross referenced to the local machine's IP address, and "SPI-out" is cross referenced to the IP address of the machine on the internet that is communicating with the local machine. The SPI for each machine is computed from information exchanged during the ISAKMP transmissions, and is carried in the AH or ESP header that is appended to UDP packets. Because IPSec protocols may be nested to provide security in a variety of environments, a single datagram may include both an AH and an ESP header, and may encrypt some header information.

Each of the foregoing security protocols modifies the UDP packet by placing new header information on the packet, modifying certain fields within the packet to conform to the protocol being used and, in some cases, encrypting the payload and all or parts of other packet headers. Thus, under IPSec, when a UDP datagram leaves a "secure" domain for transit across an untrusted network, it will normally consist of an IP header, an AH or ESP header (or both), and an encapsulated payload. Header information will include a destination address, an SPI, and sufficient SA information to ensure that the datagram reaches its destination and can be authenticated to the destination host. Encapsulation of the payload ensures that information contained within the payload is denied to unwanted eavesdroppers and hackers. The initial destination host for the datagram may be a router, gateway, or firewall between a LAN and the internet. Upon arrival at the device on the border between the LAN and the internet, the datagram may be opened, examined or decrypted in whole or in part, analyzed for further address information, and routed to a local IP address on the LAN.

The ISAKMP handshaking protocol used in IPSec requires that both hosts intending to establish a secure session between them use a process-specific port address (Port 500) for initial message exchanges. For this reason, Port 500 has been assigned for exclusive use with the ISAKMP protocol. By convention, computers attempting to negotiate secure communications parameters by employing the ISAKMP protocol must communicate strictly through each computer's Port 500. That is, ISAKMP messages from either computer must identify Port 500 as both the source and destination port addresses. If either computer receives a packet in which Port 500 is not specified as being both the source and destination, the packet will be discarded.

While this protocol provides assurance that two hosts are communicating with each other, it becomes unworkable when one host is located on a LAN that uses local IP addresses and a NAT gateway. For example, Host A, having a local IP address on a remote LAN protected by a NAT gateway, wishes to establish a secure session with Host B, located at a main office computing site. Host A would initiate the protocol by sending an unencrypted UDP datagram to Host B, giving the "destination" as Host B's IP address, and the destination port address as "Port 500." However, when the datagram reaches the NAT gateway connecting the remote LAN to the internet, the gateway will translate the destination port address to an arbitrary port number. Upon the arrival of the datagram at Host B, the ISAKMP protocol will not be recognized, and Host B will not respond. The computers will fail to establish a secure session. Because of this difficulty, it has heretofore been believed that the ISAKMP protocol cannot be used to establish a VPN using a NAT gateway where each computer on the remote LAN uses a local rather than a global IP address.

It is therefore an object of this invention to provide a gateway that will permit the use of ISAKMP protocol authentication and key exchanges between a computer having a non-global IP address and a host computer, using the internet as a transmission medium.

It is a further object of this invention to provide a gateway that will allow any number of computers on a private LAN using local IP addresses to initiate or receive messages via the internet using ISAKMP protocol.

It is another object of this invention to provide a method for employing virtual private networking between two or more LAN sites on the internet, using ISAKMP protocol to initiate secure communications.

These and other objects of the invention will become apparent throughout the following description.

SUMMARY OF THE INVENTION

In accordance with the present invention, a computer using a local IP address on a remote LAN attached to an external network such as the internet through a NAT gateway will use the ISAKMP protocol to exchange keys and establish SAs that will support a secure session under IPSec. For non-ISAKMP traffic, the gateway performs address translation as normal. However, whenever a machine on the LAN originates an ISAKMP protocol message, the gateway will identify the datagram containing port addresses of Port 500. Upon encountering such a datagram, the gateway will translate the source IP address, but will not translate the source port address, leaving it at Port 500, and will dispatch the packet to the internet with Port 500 designated as both the source and destination port addresses. The gateway will also update its internal table to "bind" Port 500 to the local IP address and associate that binding with the external IP address of the destination machine for a predetermined length of time. If a valid reply is not received within the predetermined length of time, the "binding" between Port 500 and the local IP address will be released. This feature is necessary to ensure that Port 500 is not tied-up indefinitely, such as, for example, in a situation in which an ISAKMP protocol transmission has been initiated to an incorrect destination IP address. Under those conditions, the gateway would never receive a valid reply. If there were no timer to release Port 500 after a period during which a valid reply is not received, the port would remain bound to the local IP address until the gateway was reset. For most conditions, a period of two seconds should be a sufficient length of time to maintain the binding between Port 500 and the local IP address while awaiting a valid reply.

During the time that Port 500 is bound to a local IP address, the gateway will continue normal datagram processing of datagrams not having Port 500 port addresses while awaiting a valid reply. A valid reply will be a datagram having a source IP address that is the same as the external IP address that is associated with Port 500, and will have both the source and destination port addresses as Port 500. While awaiting a valid reply, the gateway will ignore other UDP datagrams from the external network having Port 500 source and destination port addresses, but not the proper source IP address. Also, while Port 500 is bound to a local IP address, datagrams received from the LAN having source and destination port addresses of Port 500 will undergo "normal" address translation in which the Port 500 source port address will be translated to an arbitrary, unused port address before being sent to the external network. Because such a datagram does not have both a source and destination port address of Port 500, it is not a valid ISAKMP datagram, and will be ignored upon reaching its IP destination. If the period of binding Port 500 to a local IP address should expire without a valid datagram having been received by the gateway, the binding will be released, and Port 500 will become available for use by the next datagram having a Port 500 source and destination port address.

While Port 500 is bound, upon receiving a valid reply datagram having source and destination port addresses of Port 500 and the correct source IP address, the gateway will process the datagram by substituting the IP address of the local machine into the datagram header's destination IP address field, then will pass the datagram through to the LAN for delivery to the local machine. When the datagram leaves the gateway, the gateway will release the binding between the local IP address and Port 500, and will resume normal datagram processing.

If a reply having the proper source IP address and port addresses of Port 500 is not received from the external network, the gateway will time-out after a short predetermined length of time. If the gateway should time-out before a valid reply is received, that ISAKMP message exchange cannot be completed, but must be re-initiated.

Once the ISAKMP protocol has been completed, and an encrypted secure session is under way, the gateway will perform local address translations by referencing the SPI in the ESP header of incoming and outgoing datagrams. The gateway will also ensure that each packet type (type 50 for an ESP packet) is correct for the datagram being passed through the gateway. Occasionally, a secure session across a VPN will be interrupted, or a new session started. The gateway's first indication of this will be its receipt of a type 50 datagram in which the IP addresses are recognized but the SPI associated with the destination does not appear in its internal table. When this happens, the gateway will dispatch the datagram to the destination IP address using the new SPI, and will also set the destination SPI value (SPI-in or SPI-out, depending upon the direction of the transmission) in its table to the new value, and the source's SPI value to zero. Upon receiving a reply to the transmission, the gateway will replace the zero in the SPI field table with the new SPI for the destination IP address.

Because the gateway of this invention does not encrypt or decrypt messages, but simply passes the payload (which may be encrypted or unencrypted) through to the LAN or to the internet for processing at the receiving machine, it does not require intensive processing functionality, and may be used for private LANs in which expense and simplicity of setup and maintenance are considerations.

A BRIEF DESCRIPTION OF THE DRAWINGS

Further objects and advantages of the present invention can be found in the detailed description of the preferred embodiment when taken in conjunction with the accompanying drawings in which:

FIG. 4 is provided for reference in following the charts shown in FIGS. 5, 6 and 7. FIG. 4 is a table containing IP addresses of local machines on a LAN (L-1 through L-3), the internal and external IP addresses of a gateway, and the IP addresses of external devices ("targets" T-1 through T-3) on an external network.

FIGS. 5a-5c show representative fields from an internal table of the gateway cross referencing local IP addresses of machines on a LAN (L-1, L-2, . . . L-x) and external IP addresses of external devices (T-1 through T-3) with SPIs (security parameter indexes) used to authenticate encrypted datagrams. SPI-out represents the SPI of an encrypted datagram leaving the gateway for a device on the internet, while SPI-in represents the SPI of an encrypted datagram destined for a local machine on the LAN. Each view of the table, a, b and c, reflects header values for source, destination, and SPI at different points in time. The changing values signify the commencement of a new session by one a local machine with a target machine.

FIG. 6 shows representative fields in datagram headers being exchanged between a single local machine and a single device on the external network. Header values are modified through processing by the gateway of this invention.

FIG. 7 shows representative fields in datagram headers being exchanged between three local machines (L-1 through L-3) on a LAN, and three targets (T-1 through T-3) on an external network as they are modified through processing by the gateway of this invention.

Figure 8:
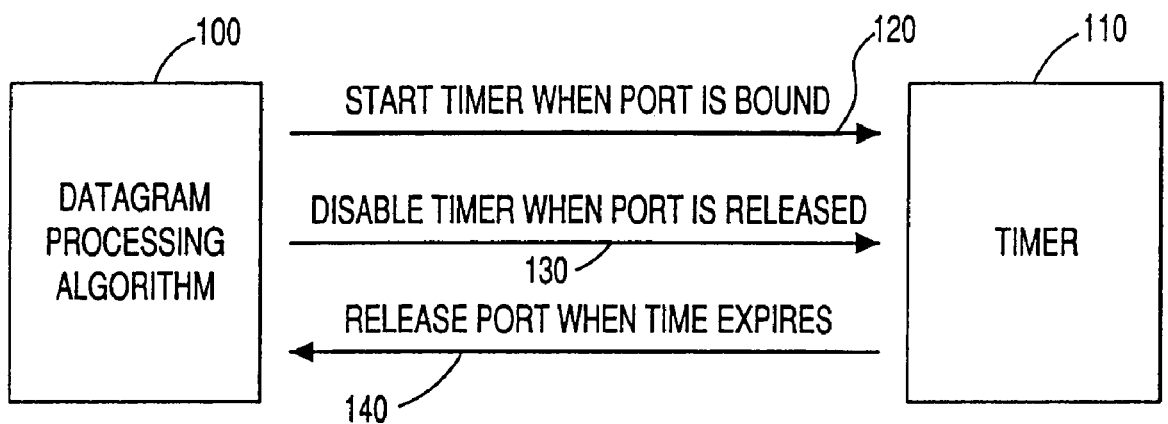

FIG. 8 is a schematic diagram of signals passing between the datagram processing function and the timer.

DETAILED DESCRIPTION OF THE DRAWINGS

Figure 1:
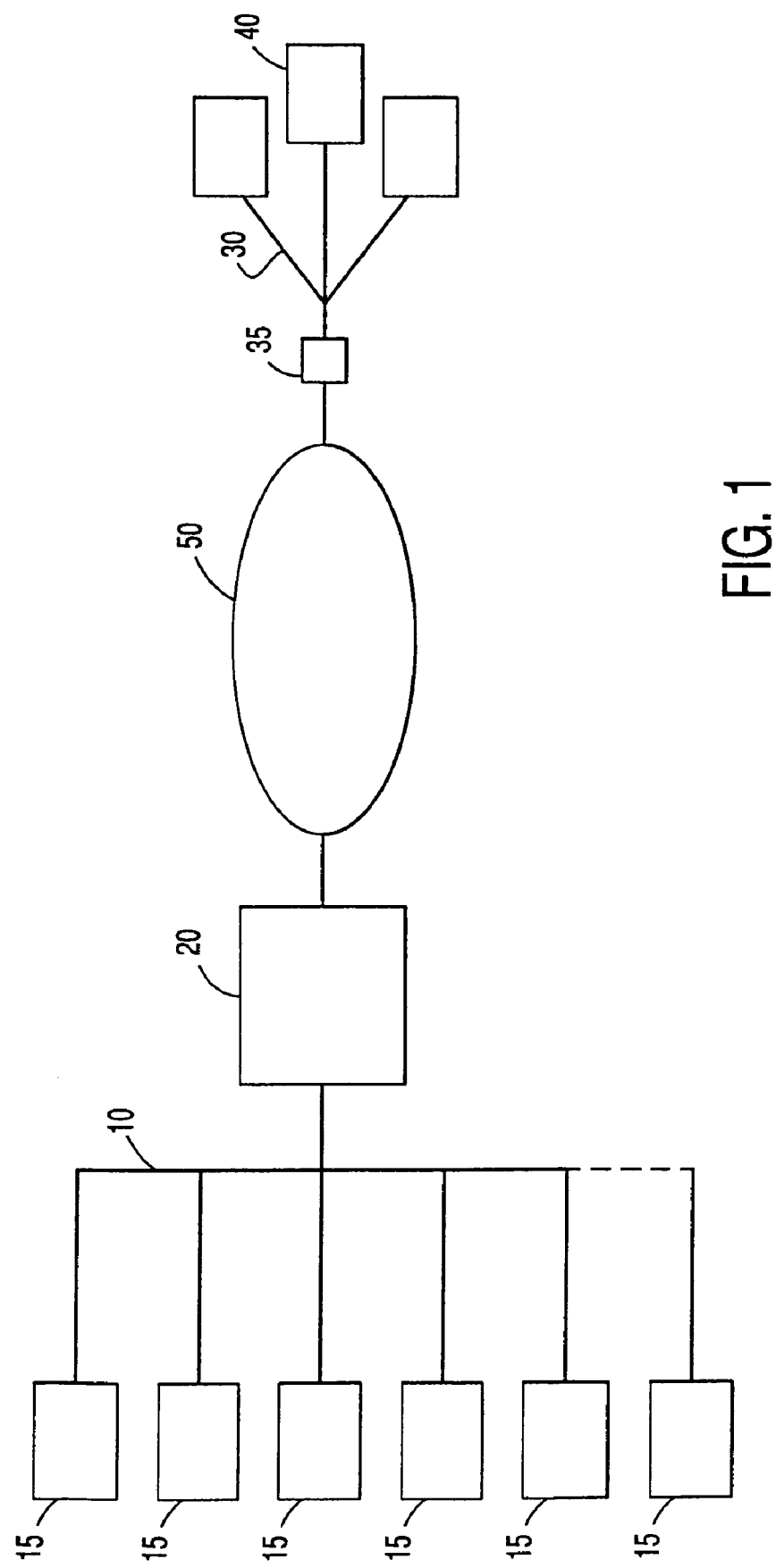
FIG. 1 depicts a virtual private network in which a remote LAN using local IP addresses is networked with a main computing site via an external network which may be the internet. The LAN is connected to the external network through a NAT gateway.

In FIG. 1, a virtual private network (VPN) is shown in which a private local area network (LAN) 10 is connected to a computing site 30 located on the internet 50. The LAN 10 uses local IP addresses, and is connected to the internet through the network address translation (NAT) gateway of this invention 20. The computing site 30 may be a business headquarters, or one of any number of private LANs used by a multinational corporation, an educational facility, or any other site which will be frequently accessed from remote locations. Such sites will normally have a firewall or gateway 35 capable of running encryption and other security applications. Such a gateway will have the ability to open a packet, decrypt or otherwise access its contents, and perform address translation, routing, de-encapsulation, and data manipulation functions as well. While such devices are able to support ISAKMP and other IPSec protocols, they do so by opening and decrypting packets, and manipulating data, and are, by and large, too expensive and powerful to be employed efficiently at remote LAN sites needing to establish a VPN with the main computing site.

A server 40 at the main site runs the VPN server software. Computers 15 at remote sites each run appropriate VPN client software that implements IPSec security protocols on each computer.

A computer 15 on the LAN 10 will communicate with devices on or across the internet through gateway 20 by sending an IP datagram to a server 40 at the computing site 30.

Figure 2:
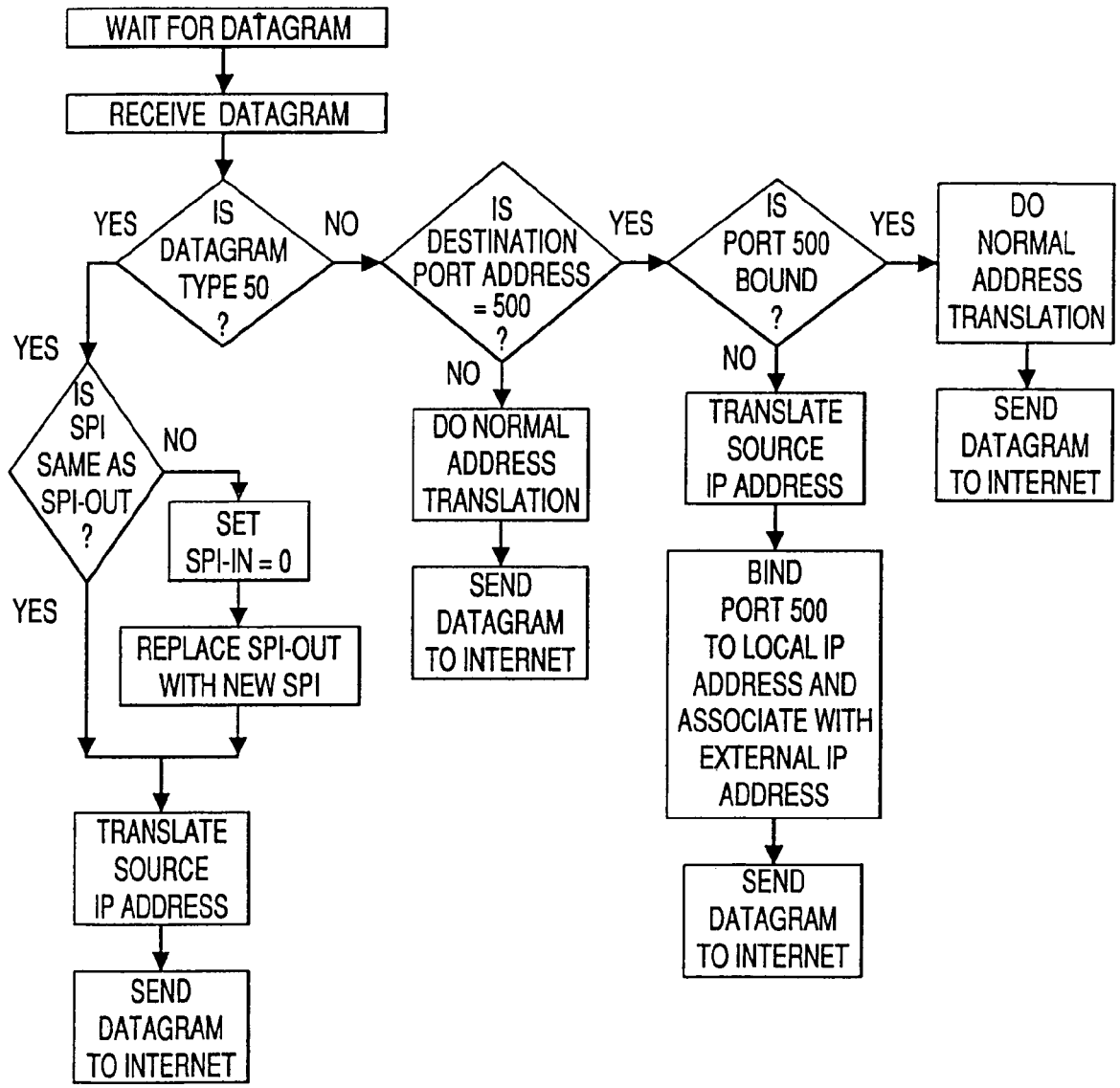
FIG. 2 depicts a decision chart used by the gateway of this invention to process UDP datagrams received from the LAN for transmission to the internet.
Figure 3:
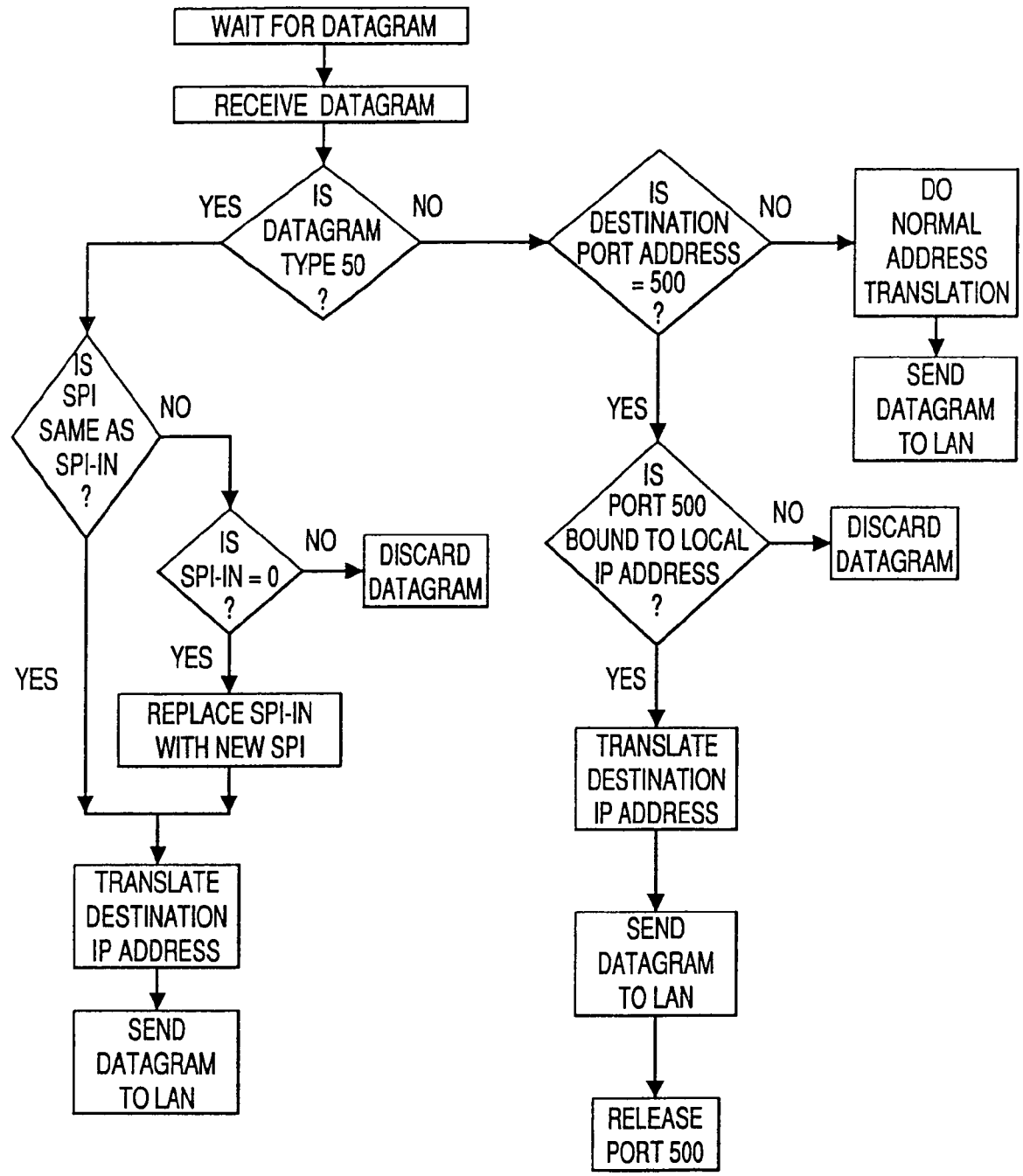
FIG. 3 depicts a decision chart of steps used by the gateway of this invention to process UDP datagrams received from the internet for delivery to a device on the LAN.

Datagrams received at the gateway 20 are processed according to the decision charts shown in FIGS. 2 and 3. Although the flow charts of FIGS. 2 and 3 show both the processing steps and a sequence for the steps, the order for performing some of the functions is not critical, and some of the steps may be done in an order other than is shown in the flow charts without affecting the ultimate result. For example, FIGS. 2 and 3 show that the first step after a datagram is received by the gateway is to determine the datagram type, while the last step is to perform the IP address translation that is necessary before the datagram is passed through the gateway. Some embodiments, however, could place the step of address translation to some point earlier in the process, and this would not affect the outcome of the process. Since the order of translating the IP address is not critical to the overall process, the determination of when this translation should be done is a matter of engineering choice.

As shown in FIG. 2, upon receiving a datagram from the LAN, the gateway will check to see whether the datagram is encrypted. It will do so by checking the "Next Header" field in the IP header to determine the type of datagram it is dealing with, and to see whether the datagram has been encrypted. A datagram type of 50 (ESP) indicates that the datagram is encrypted, and port address information may not be available.

Continuing through the decision tree of FIG. 2, if the datagram is encrypted, the gateway will check the datagram's SPI to see whether it appears in the SPI-out field of the gateway's internal table. Representative fields from such a table are shown in FIGS. 5a-5c. If the SPI of the datagram is found in the SPI-out field of the internal table, the gateway will modify the source IP address of the datagram to be the external IP address of the gateway, and will send the datagram to the external network for delivery to an external device.

If the datagram is encrypted, but the SPI does not appear in the gateway's internal table, then according to the decision chart of FIG. 2 the gateway will assume that the datagram is initiating a new session. In this case the gateway will set the SPI-in field of its internal table to zero (0) and will set SPI-out to the new SPI from the datagram. These modifications to the internal table are reflected in FIGS. 5a and 5b, in which a "new" SPI ("14662"), which did not appear in the SPI-out field of the gateway's internal table in FIG. 5a, is shown as having been entered into the SPI-out field, and SPI-in has been set to zero (0) in FIG. 5b. The encrypted datagram will then be sent to the external gateway after the source IP address has been translated from that of the local device to the external IP address of the gateway. These steps are shown in FIGS. 5b and 5c.

Continuing with the decision chart of FIG. 2, if the datagram is not encrypted, the gateway will next check the datagram's destination port address. If the port address is anything but Port 500, the gateway will enter the source port address into its internal table, cross reference it with the (local) source IP address, and will then substitute an arbitrary, unused port address into the source port address field of the IP header. It will also enter the new port address in its internal table, again cross referenced to the (local) source IP address. This process, which is used for unencrypted datagrams not having Port 500 as a port address, shall be referred to as "normal address translation" for datagrams originating on the LAN. These translations are shown in FIG. 6, rows 1 and 2. The datagram will then be dispatched to the internet for routing to the destination IP address.

In FIG. 2, where an incoming datagram's source and destination port addresses are Port 500, the gateway must next check its tables to see whether Port 500 is already bound to an IP address. If Port 500 is free, then the gateway will "bind" Port 500 to the (local) source IP address of the datagram, will create an association between the port and the (external) destination IP address, and will send to start the internal timer. The gateway will also process the datagram by substituting the gateways's external IP address for the local IP address in the source IP address field. It will not, however, translate the source port address. By suspending the "normal" translation of the source port address, the gateway ensures that the target machine will be able to recognize the datagram as being an ISAKMP datagram. These steps are also shown in FIG. 6, rows 5 and 6.

In FIG. 2, if an incoming datagram from the LAN has a source and destination port address of Port 500, but Port 500 is bound to some other local IP address, then the gateway cannot bind Port 500 for the message then being processed. In that event, the gateway will process the datagram "normally," as if it were not an ISAKMP datagram. That is, it will translate the datagram's source port address to an arbitrary number and will translate the source IP address to be that of the gateway's external IP address. The gateway will then send the datagram to the internet, where it will be rejected by the target because it does not conform to an ISAKMP datagram. This event is depicted in FIG. 7 at rows 15 and 16.

In FIG. 3, a decision chart is shown which the steps the gateway will follow in processing datagrams received from the internet. Upon receiving a datagram, the gateway will first check its type and, if the datagram is encrypted, will check to see whether the SPI appears in its internal table. If the SPI is recognized, its destination IP address will be translated to be the IP address of the local device, and the datagram will be passed to the LAN for delivery to the local device. If the SPI is not recognized, the gateway will next check to see whether its SPI-in field corresponding to the datagram's source IP address is zero (0). If SPI-in is zero, the gateway will assume that the datagram is the first reply of a new session and will replace the zero in the SPI-in field with the SPI of the datagram. The gateway will then translate the destination IP address to be the local IP address of the device on the LAN, and will send the datagram to the LAN for delivery. This event is shown in FIGS. 5b and 5c. In FIG. 5b, the SPI-in for local machine L-1 has been set to zero. Upon the gateway's receipt of a datagram from the internet having an SPI of 3288, the gateway will not find that SPI in its SPI-in field. The gateway will next check to see whether the SPI-in field is holding a value of zero. Upon determining that SPI-in for local machine L-1 is zero, the gateway will replace the zero with the SPI of the datagram ("3288") and will send the datagram to the LAN. This is shown in FIG. 5c.

In FIG. 3, if the datagram from the internet is not encrypted, the gateway will check to see whether it has a port address of 500. If it does not, the datagram will undergo "normal" address translation for datagrams from the external network, meaning that the local port address and local IP address of the device on the LAN will be substituted into the destination fields of the datagram, and the datagram will be sent to the LAN for delivery. This "normal" address translation for datagrams from the internet is shown in FIG. 6 at rows 3 and 4.

Again referring to FIG. 3, If the datagram does have a port address of 500, the gateway must next check to see whether Port 500 is bound to a local IP address and is associated with the datagram's (external) source IP address. If it is, then the datagram is valid, and will be passed to the LAN after the destination IP address has been translated from that of the external gateway to the IP address of the local device. Upon passing the datagram to the LAN, the gateway will release Port 500. This event is illustrated in FIG. 6 at rows 7 and 8.

If, in FIG. 3, Port 500 is bound to a local IP address, and is associated with an external IP address other than that found in the source IP address of the datagram, then the datagram is not valid and will not be further processed by the gateway. This event may be seen in FIG. 7 at rows 25-31. At rows 25 and 26, local machine L-1 sends an ISAKMP datagram to target T-1. At this point, Port 500 is bound to the IP address of local machine L-1 and is associated with the IP address of target T-1. However, as shown in FIG. 7, the timer "times" out before a reply is received at the gateway from T-1, and, at row 27, Port 500 is released. At rows 28 and 29, local machine L-3 sends an ISAKMP datagram to target T-3, binding Port 500 to L-3's IP address and creating an association with T-3's IP address. While Port 500 is bound, a reply is received from T-1. However, because Port 500 is bound, and is associated with T-3's IP address, the reply from T-1 is discarded. This is shown at rows 30 and 31 of FIG. 7.

FIGS. 5a-5c depict an internal table of the gateway in which the IP addresses and SPI numbers for encrypted communications between local computers and targets on the internet are maintained. Fields for "L-1," "L-2," "L-x," and "T-1" through "T-3" are included for ease of reference, and do not appear in the gateway's internal tables. In FIG. 5, the field "SPI-out" holds the SPI for each target machine during a secure session with a specific computer on the LAN. The "SPI-in" field gives the corresponding SPI that will be recognized by the local computer as signifying a valid datagram intended for it. FIG. 5a shows the table at a beginning time. Eight (8) local computers have participated in encrypted sessions with three targets, T-1 through T-3 during the life of the table's data. This is shown by the fact that each local machine shows an SPI-in associated with its IP address. Although only three targets are shown in the table, it may be noted that each target is using a different SPI-out for communications with each local machine. In this manner, a target will know from which source an encrypted datagram was generated.

FIG. 5b shows the same local and target computers as FIG. 5a. Here, however, the SPI-out for the session between L-1 and T-1 is a new SPI, indicating a new session between the computers. The gateway's first indication that a new session is taking place is its receipt of an encrypted datagram from the LAN having an SPI—"14662"—that is not in its table. The gateway forwards the datagram to the internet, but also modifies its table to place the new SPI in the SPI-out field associated with the source and destination IP addresses for that datagram. It also places a zero in the SPI-in field as a marker to indicate that a new SPI-in is also expected. FIG. 5c shows that a new SPI—"3288"—was included in a datagram received from T-1. That SPI has been entered into the gateway's SPI-in field, and further communications between L-1 and T-1 during this session will use those SPI's to authenticate their messages.

FIG. 6 charts the flow of representative datagrams through the gateway of this invention by a single computer on a LAN communicating with a remote target on the internet. Each row of the chart represents information in a datagram at either the LAN interface with the gateway or the internet interface with the gateway. Consecutive rows represent data entering the gateway from one side and leaving the gateway at the other. The gateway has one IP address, which may be a local IP address, at its interface with the LAN, and a global IP address at its interface with the internet. The columns in FIG. 6 depict the side of the gateway the datagram is traversing, the type of datagram, the datagram's source IP address and port address, the datagram's destination IP address and port address, and the datagram's Security Parameter Index (SPI) for encrypted datagrams of type 50, using ESP (Encapsulated Security Payload) protocol.

Row 1 of FIG. 6 shows a UDP datagram arriving at the local interface of the gateway, and having a source IP address corresponding to local computer L-1, and a destination IP address of the target on the internet, T-1. For ease of reading, FIG. 4 provides a table of IP addresses cross referenced with local designations L-1 through L-3, and target designations T-1 through T-3. The source port address for L-1 is Port 6404, and the target's destination port is Port 80. Since the datagram is not encrypted, and does not exhibit a port number of 500, it undergoes a normal translation in which an "arbitrary" port address, Port 10425 is substituted into the source port address field and the gateway's external IP address is substituted for the source IP address of the datagram. Although the translated source port address is said to be "arbitrary," it will normally be the next in a sequence taken from a pool of unreserved and presently unused port addresses maintained by the gateway.

As the datagram exits the gateway, as shown FIG. 6, in row 2, the address translation function of the gateway has substituted the gateway's external IP address into the datagram header for the source IP address, and has given the source port an arbitrary number. Rows 3 and 4 show the reply datagram from the target. In row 3, a UDP datagram from the target shows the destination IP address as being the external IP address of the gateway, and a destination port as being the port address arbitrarily assigned by the gateway. Since the datagram is not encrypted and does not have a port address of 500, the datagram undergoes normal translation of the destination port address and IP address, then is sent to the LAN. In row 4, the gateway has substituted the local computer's local IP address and port address in the destination fields of the header before sending the datagram to the LAN.

In row 5 of FIG. 6, the local computer initiates an ISAKMP protocol with the target. The datagram type is shown as ISAKMP. Both the source and destination port addresses are Port 500. When the gateway determines that the destination port address is Port 500, it checks to see whether Port 500 is currently bound to any IP address. Since it is not, the gateway passes the datagram, translating only the source IP address field to show the gateway's external IP address, but without changing the source port address.

In FIG. 6, rows 5-16 show the six standard ISAKMP "handshaking" datagram exchanges necessary to establish SAs (Security Associations) to support fully encrypted and authenticated datagrams. Although some modes of ISAKMP use fewer exchanges, the main mode is depicted in FIG. 6. Following the establishing of SAs, the local computer and the target begin communicating using ESP protocol encrypted datagrams. Here, datagram validity is maintained through the use of Security Parameter Indexing—SPI—numbers in an SPI field of the datagram's header. Each host recognizes a datagram "addressed" to its SPI, which can be modified during a session by mutual agreement of the hosts as necessary to ensure continued security. When an encrypted datagram passes through the gateway, as depicted at FIG. 6, rows 17 and 18, neither the source nor the destination SPI is modified by the gateway, although the datagram's source IP address is translated to be the gateway's external IP address.

Thus, when an encrypted datagram is received by the gateway, it will be signified by a datagram of type 50 (ESP). Upon encountering that datagram type, the gateway will check the datagram's Security Parameter Index (SPI) to see whether that SPI is recorded in its internal table. If it is, the gateway will translate the datagram's source or destination IP address, as appropriate, and will send the datagram to the LAN or the internet, depending upon the direction of transmission. However, if the SPI of a datagram from the LAN does not appear in the gateway's internal table, and the source and destination are recognized IP addresses, the gateway will assume that a new session has been started. In this case, it will pass the datagram to the external network leaving the new SPI intact, but recording the new SPI in the "SPI-out" field of its internal table and placing a zero into the "SPI-in" field. At rows 25 and 26 it may be seen that a new SPI has appeared, signifying a new session. This event corresponds to FIG. 5*b*, where the "0" in the "SPI-in" field corresponds to the new SPI-out of "14662." At rows 27 and 28, the reply packet from the external network shows that "old" SPI "9802" has been replaced with "new" SPI "3288."

FIG. 7 is similar to FIG. 6, except that it illustrates the passage through the gateway of this invention of datagrams between three computers on a LAN, designated L-1, L-2, and L-3, and three targets on the internet having unique global IP addresses, T-1, T-2 and T-3. In FIG. 4, for ease of reference, a table containing the IP addresses of these devices is given. As shown in FIG. 7, a transmission designated "L-1 Out" represents a transmission from local computer L-1 to the gateway. "T-1 In" represents a transmission from the gateway to target T-1. "T-1 Out" represents a transmission from target T-1 to the gateway, while "L-1 In" represents a transmission from the gateway to computer L-1.

As shown in rows 1-8 of FIG. 7, computers L-1 and L-2 conduct "in the clear" communications with targets T-1 and T-2. At row 9, L-1 commences an ISAKMP session with T-1. Rows 9-14 show the first three messages exchanged between L-1 and T-1 during the ISAKMP protocol. At row 15, computer L-3 commences an ISAKMP-1 message exchange with T-3. However, at that time Port 500 is bound to L-1 and is associated with the IP address of T-1, awaiting an ISAKMP-4 reply from T-1. In this situation, the datagram from L-3 cannot bind Port 500, and its source port address will be translated. As such, L-3 cannot complete the transmission that was started at row 15.

Thereafter, at rows 17-18, T-1's reply (ISAKMP-4) is received at the gateway and sent to L-1, and Port 500 immediately becomes available. Thus, when L-3 reattempts its ISAKMP-1 transmission at row 19, the transmission is successful.

At rows 19-20 of FIG. 7, L-3's ISAKMP-1 transmission binds Port 500 to L-3's IP address. Thus, when L-1 attempts its ISAKMP-5 transmission, at rows 21-22, Port 500 is not available, and the gateway simply translates the destination port address from Port 500 to an "arbitrary" port number—in this case, "9063"—and sends the datagram to the internet, where target T-1 will not recognize it as an ISAKMP datagram. However, after L-3 releases Port 500, at rows 23-24, L-1's next attempt to send its ISAKMP-5 transmission is successfully received by T-1. However, T-1's reply is slow, and, at row 27, Port 500 is released from its binding to L-1, and, at rows 28-29, is immediately grabbed by L-3 for an ISAKMP-3 transmission. Thus, when T-1's ISAKMP-6 reply arrives at the gateway, as is shown at rows 30 and 31, Port 500 is blocked, and the datagram is ignored. Thereafter, L-1, not having received a reply to its ISAKMP-5 message, retransmits it at rows 34-35, and a reply from T-1 is received at rows 36-37. Following their ISAKMP handshaking, L-1 and T-1 can communicate securely, using ESP protocol at rows 38-39 and 42-43.

Rows 38-57 of FIG. 7 demonstrate the gateway's handling of a variety of datagrams between a number of local computers and targets. UDP datagrams are shown at rows 40-41, ESP datagrams at rows 42-43 and 52-53, and ISAKMP datagrams at rows 44-45. While the chart of FIG. 7 shows different IP addresses for each device, in practice it may occur that a number of processes will be running on the same device. The substitution of unique source ports by the gateway, and the use of SPI's to differentiate encrypted transmissions ensures that datagrams emanating from multiple processes running on a single machine will not be misdirected.

FIG. 8 depicts the initiation and transfer of signals between the datagram processing circuitry 100 and the timer 110. Upon the occurrence of an event requiring a port address to be bound to an IP address, a signal 120 will be sent to the timer to commence timing. Upon the expiration of the appropriate interval, the timer will send a signal 140 indicating that time has expired, in which case any port that is bound will be released. In the interim, if an expected datagram has arrived, and a previously bound port is to be released, a disabling signal 130 will be sent to the timer indicating that the timer should be reset to await the next signal to begin timing. Obviously, there are numerous timing circuits known in the art, and the specific configuration shown in FIG. 8 is only one of many possible embodiments.

From the foregoing it will be understood by those of skill in the art that the preferred embodiment described herein is not the only means for practicing the invention, and that other embodiments may be chosen to practice the invention without departing from the spirit and scope of the invention. For example, although the preferred embodiment is described with reference to Port 500, which has been reserved exclusively for use with the ISAKMP protocol, the invention may be employed in the same manner for processing datagrams destined for other port addresses that may in the future be assigned to other processes or protocols. In particular, many games played over the internet require the use of specific ports on local and external machines that cannot withstand normal address translation. Additionally, although the invention has been described primarily with respect to communications between a private LAN and the internet, it will be apparent that the gateway of this invention can be used at any interface between two networks and will have the same functionality as has been described.

The claims appended hereto are meant to cover modifications and changes within the spirit and scope of the present invention.

What is claimed is:

1. A method of processing IP datagrams from a local device on a LAN using local IP addresses through a network address translating ("NAT") gateway to an external device on an external network comprising:
   maintaining one or more tables associating local IP addresses of local devices on said LAN, external IP addresses of external devices on said external network, port addresses of said local devices, port addresses of said external devices, security parameter index ("SPI")-in values, and SPI-out values;
   receiving a datagram from the local device on said LAN;
   determining whether said datagram is encrypted and, if said datagram is encrypted, determining whether an SPI of said datagram is recorded in said one or more tables and, if so, modifying a source IP address of said datagram to be an external IP address of said NAT gateway and passing said datagram to said external network for routing and delivery to an external device having an IP address that corresponds to a destination IP address of said datagram;
   and if said SPI is not recorded in said one or more tables, setting an SPI-out field corresponding to the IP address of said external device equal to said SPI and setting an associated SPI-in field of said one or more tables to zero, modifying said source IP address of said datagram to be said external IP address of said NAT gateway, and passing said datagram to said external network for routing and delivery to said external device,
   and if said datagram is not encrypted, determining whether a destination port address for said datagram is a predetermined process-specific port address and, if not, performing normal address translation upon said datagram and passing said datagram to said external network for routing and delivery to said external device,
   and if said destination port address is the predetermined process-specific port address, determining whether said destination port address is bound to an IP address;
   and if said destination port address is not bound to an IP address, modifying said source IP address of said datagram to be said external IP address for said NAT gateway, binding said destination port address to a local IP address of said local device and creating an association between said destination port address and said external IP address of said external device, and passing said datagram to said external network for routing and delivery to said external device.

2. The method of processing IP datagrams as claimed in claim 1, further comprising:
   if said destination port address is bound to an IP address, performing normal address translation upon said datagram and passing said datagram to said external network for routing and delivery to said external device.

3. The method of processing IP datagrams as claimed in claim 1, further comprising:
   releasing the destination port address if a valid reply is not received by the NAT gateway from said external network within expiration of a predetermined length of time.

4. The method of processing IP datagrams as claimed in claim 3, further comprising:
   starting a timer in response to binding said destination port address to said local IP address of said local device;
   and, if a valid reply is received by the NAT gateway from said external network within expiration of a predetermined length of time, resetting said timer.

5. The method of processing IP datagrams as claimed in claim 1, in which said external network is the internet.

6. The method of processing IP datagrams as claimed in claim 1, in which said LAN is a virtual private network.

7. A method of processing IP datagrams from an external device on an external network through a network address translating ("NAT") gateway to a local device on a LAN using local IP addresses, comprising the steps of
   maintaining one or more tables associating local IP addresses of local devices on said LAN, external IP addresses of external devices on said external network, port addresses of said local devices, port addresses of said external devices, security parameter index ("SPI")-in values, SPI-out values;
   receiving a datagram from said external network;
   determining whether said datagram is encrypted and, if said datagram is encrypted, determining whether an SPI of said datagram is recorded in said one or more tables and, if so, modifying a destination IP address of said datagram to be an internal IP address of said local device and passing said datagram to said LAN for routing and delivery to said local device,
   and if said SPI is not recorded in said one or more tables, determining whether an SPI-in field corresponding to an IP address of said external device is zero, and if said SPI-in field is not zero, discarding said datagram,
   and if said SPI-in field is equal to zero, modifying said SPI-in field to be said SPI, modifying said destination IP address of said datagram to be said local IP address of said local device, and passing said datagram to said LAN for routing and delivery to said local device,
   and if said datagram is not encrypted, determining whether the destination port address for said datagram is a predetermined process-specific port address, and if not, performing normal address translation and passing said datagram to said LAN for routing and delivery to said local device, and if said destination port address is the predetermined process-specific port address, determining whether said destination port address is bound to said local IP address, and if said destination port is not bound to said local IP address, discarding said datagram, and if said destination port address is bound to said local IP address, modifying said destination IP address of said datagram to be said local IP address of said local device, unbinding said destination port address from said local IP address, and passing said datagram to said LAN for routing and delivery to said local device.

8. The method of processing IP datagrams as claimed in claim 7, in which said external network is the internet.

9. The method of processing IP datagrams as claimed in claim 7, in which said LAN is a virtual private network.

10. An apparatus, comprising:
an interface to a LAN;
an interface to an external network; and
a network address translating ("NAT") gateway configured to:
maintain one or more tables associating local IP addresses of local devices on said LAN, external IP addresses of external devices on said external network, port addresses of said local devices, port addresses of said external devices, security parameter index ("SPI")-in values, and SPI-out values;
receive a datagram from a local device on said LAN;
determine whether said datagram is encrypted and, responsive to said datagram being encrypted, determine whether an SPI of said datagram is recorded in said one or more tables and, responsive to said SPI being recorded in said one or more tables, modify a source IP address of said datagram to be an external IP address of said NAT gateway and pass said datagram to said external network for routing and delivery to an external device having an IP address that corresponds to a destination IP address of said datagram;
and responsive to said SPI is not being recorded in said one or more tables, set an SPI-out field corresponding to the IP address of said external device equal to said SPI, set an associated SPI-in field of said one or more tables to zero, modify said source IP address of said datagram to be said external IP address of said NAT gateway, and pass said datagram to said external network for routing and delivery to said external device,
and responsive to said datagram not being encrypted, determine whether a destination port address for said datagram is a predetermined process-specific port address and, responsive to the destination port address not being the predetermined process-specific port address, perform normal address translation upon said datagram and pass said datagram to said external network for routing and delivery to said external device,
and responsive to said destination port address being the predetermined process-specific port address, determine whether said destination port address is bound to an IP address;
and responsive to said destination port address not being bound to an IP address, modify said source IP address of said datagram to be said external IP address for said NAT gateway, bind said destination port address to a local IP address of said local device, create an association between said destination port address and said external IP address of said external device, and pass said datagram to said external network for routing and delivery to said external device.

11. The apparatus as claimed in claim 10, wherein the NAT gateway is further configured to, responsive to said destination port address being bound to an IP address, perform normal address translation upon said datagram and pass said datagram to said external network for routing and delivery to said external device.

12. The apparatus as claimed in claim 10, wherein the NAT gateway is further configured to:
release the destination port address if a valid reply is not received by the NAT gateway from said external network within expiration of a predetermined length of time.

13. The apparatus as claimed in claim 12, wherein the NAT gateway is further configured to:
start a timer in response to binding said destination port address to said local IP address of said local device;
and, if a valid reply is received by the NAT gateway from said external network within expiration of a predetermined length of time, reset said timer.

14. The apparatus as claimed in claim 10, in which said external network is the internet.

15. The apparatus as claimed in claim 10, in which said LAN is a virtual private network.

16. A method of processing IP datagrams from a local device on a LAN using local IP addresses through a network address translating ("NAT") gateway to an external device on an external network comprising:
maintaining one or more tables associating local IP addresses of local devices on said LAN, external IP addresses of external devices on said external network, port addresses of said local devices, port addresses of said external devices, security parameter index ("SPI")-in values, and SPI-out values;
receiving a datagram from the local device on said LAN;
determining whether said datagram is encrypted and, if said datagram is encrypted, modifying a source IP address of said datagram to be an external IP address of said NAT gateway and passing said datagram to said external network for routing and delivery to an external device having an IP address that corresponds to a destination IP address of said datagram, and, depending on whether an SPI of said datagram is recorded in said one or more tables, selectively setting said SPI-in and/or SPI-out values;
and if said datagram is not encrypted, determining whether a destination port address for said datagram is a predetermined process-specific port address and, if not, performing normal address translation upon said datagram and passing said datagram to said external network for routing and delivery to said external device,
and if said destination port address is the predetermined process-specific port address, determining whether said destination port address is bound to an IP address;
and if said destination port address is not bound to an IP address, modifying said source IP address of said datagram to be said external IP address for said NAT gateway, binding said destination port address to a local ISP address of said local device and creating an association between said destination port address and said external ISP address of said external device, and passing said datagram to said external network for routing and delivery to said external device.

17. The method of processing ISP datagrams as claimed in claim 16, further comprising:

if said destination port address is bound to an IP address, performing normal address translation upon said datagram and passing said datagram to said external network for routing and delivery to said external device.

18. The method of processing IP datagrams as claimed in claim 16, further comprising:
releasing the destination port address if a valid reply is not received by the NAT gateway from said external network within expiration of a predetermined length of time.

19. An apparatus, comprising:
an interface to a LAN;
an interface to an external network; and
a network address translating ("NAT") gateway configured to:
maintain one or more tables associating local IP addresses of local devices on said LAN, external IP addresses of external devices on said external network, port addresses of said local devices, port addresses of said external devices, security parameter index ("SPI")-in values, and SPI-out values;
receive a datagram from a local device on said LAN;
determine whether said datagram is encrypted and, responsive to said datagram being encrypted, modify a source IP address of said datagram to be an external IP address of said NAT gateway and pass said datagram to said external network for routing and delivery to an external device having an IP address that corresponds to a destination IP address of said datagram, and, depending on whether an SPI of said datagram is recorded in said one or more tables, selectively set said SPI-in and/or SPI-out values;
and responsive to said datagram not being encrypted, determine whether a destination port address for said datagram is a predetermined process-specific port address and, responsive to the destination port address not being the predetermined process-specific port address, perform normal address translation upon said datagram and pass said datagram to said external network for routing and delivery to said external device,
and responsive to said destination port address being the predetermined process-specific port address, determine whether said destination port address is bound to an IP address;
and responsive to said destination port address not being bound to an IP address, modify said source IP address of said datagram to be said external IP address for said NAT gateway, bind said destination port address to a local IP address of said local device, create an association between said destination port address and said external IP address of said external device, and pass said datagram to said external network for routing and delivery to said external device.

20. The apparatus as claimed in claim 19, wherein the NAT gateway is further configured to, responsive to said destination port address being bound to an IP address, perform normal address translation upon said datagram and pass said datagram to said external network for routing and delivery to said external device.

21. The apparatus as claimed in claim 19, wherein the NAT gateway is further configured to:
release the destination port address if a valid reply is not received by the NAT gateway from said external network within expiration of a predetermined length of time.

* * * * *

UNITED STATES PATENT AND TRADEMARK OFFICE
CERTIFICATE OF CORRECTION

| | |
|---|---|
| PATENT NO. | : 7,581,247 B2 |
| APPLICATION NO. | : 11/405222 |
| DATED | : August 25, 2009 |
| INVENTOR(S) | : Israel Daniel Sultan |

It is certified that error appears in the above-identified patent and that said Letters Patent is hereby corrected as shown below:

In the Claims:

Claim 16, col. 16, line 60, please replace --ISP-- with "IP".

Claim 16, col. 16, line 63, please replace --ISP-- with "IP".

Claim 17, col. 16, line 66, please replace --ISP-- with "IP".

Signed and Sealed this

Twenty-fourth Day of November, 2009

David J. Kappos
*Director of the United States Patent and Trademark Office*